US011979974B1

(12) United States Patent
Medvedev

(10) Patent No.: US 11,979,974 B1
(45) Date of Patent: May 7, 2024

(54) SYSTEM AND METHOD FOR PLASMA GENERATION OF NITRIC OXIDE

(71) Applicant: INNO-HALE Ltd., Hertzeliya (IL)

(72) Inventor: Dmitry Medvedev, Moscow (RU)

(73) Assignee: INNO-HALE LTD, Hertzeliya (IL)

( * ) Notice: Subject to any disclaimer, the term of this patent is extended or adjusted under 35 U.S.C. 154(b) by 806 days.

(21) Appl. No.: 16/893,182

(22) Filed: Jun. 4, 2020

(51) Int. Cl.
*H05H 1/36* (2006.01)
*H05H 1/34* (2006.01)

(52) U.S. Cl.
CPC ............. *H05H 1/36* (2013.01); *H05H 1/3447* (2021.05); *H05H 1/3478* (2021.05)

(58) Field of Classification Search
CPC ....... H05H 1/36; H05H 1/3447; H05H 1/3478
USPC ...................................................... 219/121.36
See application file for complete search history.

(56) References Cited

U.S. PATENT DOCUMENTS 3,644,781 A * 2/1972 Sheer ....................... H01J 37/32 219/121.36
3,649,805 A * 3/1972 Rohrberg ................. H05H 1/34 219/121.45
3,865,173 A * 2/1975 Rohrberg ............... B23K 10/02 164/289
6,629,974 B2 * 10/2003 Penny ...................... H05H 1/46 606/41
6,958,063 B1 * 10/2005 Soll ...................... A61B 18/042 606/49
7,335,199 B2 * 2/2008 Goble ...................... H05H 1/46 606/49
10,045,432 B1 * 8/2018 Medvedev ............... H05H 1/34
2005/0200256 A1 * 9/2005 Adamenko .............. G21G 1/10 313/238
2008/0017616 A1 * 1/2008 Lee .......................... H05H 1/46 219/121.36
2017/0034898 A1 * 2/2017 Moss ....................... H05H 1/36

(Continued)

FOREIGN PATENT DOCUMENTS

EA 201190213 A1 1/2012
JP H05266991 A 10/1993

(Continued)

OTHER PUBLICATIONS

WO2015/141768 (Year: 2023).*
CN113163568 (Year: 2023).*

*Primary Examiner* — Nathaniel E Wiehe
*Assistant Examiner* — Frederick F Calvetti
(74) *Attorney, Agent, or Firm* — The Roy Gross Law Firm, LLC; Roy Gross

(57) ABSTRACT

Plasmatron includes an anode having a cylindrical proximal portion and a cylindrical distal portion, the distal portion having a smaller diameter than the proximal portion; a connecting portion connecting the proximal and distal portions and having walls oriented at 40-60 degrees to a center axis of the anode; a cathode having a generally cylindrical shape in its proximal portion and a tapering at a 30-45 degree angle to the center axis of the anode in its distal portion, with a cylindrical rod on its tip. Gap between the connecting portion of the anode and the distal portion of the cathode is double the gap between the proximal portion of the anode and the proximal portion of the cathode. High voltage power supply provides an operating voltage of 800-2500 volts and a current of 0.3-0.7 A. Length of the rod is approximately 1.5 times its diameter.

12 Claims, 11 Drawing Sheets

Voltage waveform after high voltage transformer

(56) References Cited

U.S. PATENT DOCUMENTS

| | | | | |
|---|---|---|---|---|
| 2017/0081221 | A1* | 3/2017 | Namihira | B03C 1/02 |
| 2017/0311432 | A1* | 10/2017 | Eckert | H05H 1/42 |
| 2018/0123526 | A1* | 5/2018 | Grede | H03F 3/193 |

FOREIGN PATENT DOCUMENTS

| | | | |
|---|---|---|---|
| JP | H0785992 | A1 | 3/1995 |
| JP | 2546143 | B2 | 10/1996 |
| JP | H08306329 | A | 11/1996 |
| SU | 1168071 | A1 | 10/1988 |
| WO | 2015141768 | A1 | 4/2017 |

* cited by examiner

Voltage waveform after high voltage transformer

SYSTEM AND METHOD FOR PLASMA GENERATION OF NITRIC OXIDE

BACKGROUND OF THE INVENTION

Field of the Invention

The invention relates to plasmatrons, and, more particularly, to plasmatrons that produce Nitric Oxide (NO), particularly for medical applications.

Description of the Related Art

Nitric oxide (NO) therapy is powerful tool which can be used in many medical application, and especially in pulmonology. Pulmonary arterial hypertension (PAH) is a fatal condition with a poor prognosis. Unfortunately, pharmacological treatment is not effective and at least 50% of patients die during 2-5 years, depending on the stage of the disease. While the precise mechanism(s) that mediate the onset and progression of the disease remain undefined, several factors have been implicated in the pathology of PAH. One of the most important mediators is Nitric Oxide (NO), which contributes to the pulmonary artery vasoconstriction, vascular remodeling and right ventricular failure that are features of the PAH.

The vasodilator and anti-proliferative actions of NO make it an attractive tool for pharmacological treatment of PAH. Administration of NO gas by inhalation has been shown to be beneficial to patients with PAH, particularly in kids with congenital heart diseases. However, the usefulness of inhaled NO as a treatment is limited due to cost, technical difficulties and the fact that not all patients respond to the therapy. Rapid withdrawal of inhaled NO therapy can also have deleterious effects with oxygenation and pulmonary hypertension returning to levels worse than those seen prior to the commencement of therapy. This invention relates to high-voltage plasmatrons that utilize as a portable air cooled device, such as those that may be used for nitrogen monoxide generation from oxygen and nitrogen mixture or from air.

Arc plasmatron is one of popular and practically usable methods of thermal plasma generation used for different applications such as metal cutting, waste utilization, small scale chemical production and others, where a high-temperature plasma torch can be used. A power region of conventional arc plasmatrons is 1-1000 kW, and design of electrodes should provide proper electrodes' cooling conditions to prevent the electrodes from overheating and deterioration. A traditional solution is to use a liquid cooling system. Nevertheless, electrodes' lifetime of conventional plasmatrons is limited, and electrodes of the plasmatron (especially cathode) are frequently replaced.

Recently, new applications of plasmatrons appeared, which do not require such high power and torch temperature as did conventional arc plasmatrons. These new applications are related to surface treatment not only by utilizing high temperature, but also using other active agents generated by plasma: UV radiation, active molecules generated from initial gas blowing through plasmatron, active particles including excited molecules and radicals, etc. New applications of such plasma generators can be found in different industries: microelectronics, synthetic fiber manufacturing and modification, and medicine and laboratory use.

Using traditional designs of plasmatrons for new applications is not convenient because of such features as liquid cooling of electrodes and limitation on electrodes' lifetime, which dramatically decreases the reliability, the operation time, and the compactness of system. These features also increase operation costs and, therefore, can make new small scale applications practically impossible.

A conventionally designed plasmatron has similar dimensions and power region to the new high voltage low current plasmatron but works at a relatively high current and low voltage. For example, in this case working voltage is 160 V, current of 5 A and power of 800 W. This plasmatron has been developed for an ignition system. It has no liquid cooling systems and has a working time about 30 sec. After this short time, electrodes start overheating and the plasmatron needs time for cooling down. Total operation time of such devices is only about 50 hours. It cannot be used for tasks that need long operation time. Accordingly, there is a need in the art for a plasmatron design that addresses these problems.

The invention described in U.S. Pat. No. 10,045,432 B1, incorporated herein by reference, is directed to a low current high voltage plasmatron. As described therein, a plasma generation system includes an anode having a generally cylindrical proximal portion and a generally cylindrical distal portion, the distal portion having a smaller diameter than the first portion; a connecting portion connecting the first and second portions and having walls oriented at approximately 45 degrees to a center axis of the anode; a cathode having a generally cylindrical shape in its proximal portion and a tapering at approximately a 30 degree angle to the center axis of the anode in its distal portion, where a gap between the connecting portion of the anode and the distal portion of the cathode is at least twice as large as a gap between the proximal portion of the anode and the proximal portion of the cathode; and a high voltage power supply providing an operating voltage in a range of 800-2500 volts and a current of about 0.3-0.7 A to the cathode.

This type of plasmatron has completely different electric characteristics. The heating of electrodes and subsequent electrodes' erosion problems are caused by electric current. Significant part of total power dissipated in the plasmatron is dissipated in electrode layers close to electrodes' surface and cause electrodes' heating. This power is not used properly and will not go into plasma torch heating. The energy losses that go into electrodes' heating are proportional to the electric current and decrease if the current decreases. To decrease the current and to keep the power at the same time it is necessary to change power supply volt-ampere characteristic and plasmatron electrodes to stimulate new operation mode with low current and high voltage. Because of this, this low current plasmatron can operate continuously for a long time (thousands of hours) without any special cooling of electrodes, but a conventional high current plasmatron can operate continuously for only about 30 sec—or it needs an advanced liquid cooling system. Electrodes' erosion in conventional high current plasmatrons is also dramatically higher (by about 100×) compared to the low current high voltage plasmatron. The reason is the same—low operating current in U.S. Pat. No. 10,045,432 B1 plasmatron design.

These results have been achieved by modification of the power supply and plasma channel geometry. Power supply of U.S. Pat. No. 10,045,432 B1 plasmatron has been designed with a volt-ampere characteristics which provide for the arc voltage with more than 1 kV. This way, the plasma filament can stretch up to the high length and voltage and reach a mode with a secondary breakdowns between cathode and anode during operation.

The approach of U.S. Pat. No. 10,045,432 B1 solves the main problems of traditional plasmatrons—high energy losses in electrodes and small electrodes lifetime. But for applications which can make extra demands to stability of operation parameters, like nitric oxide generation for medical applications, this design can be improved by improving of power supply and plasmatron design. The problem of described plasmatron design is the possibility of an operating mode where the plasma filament jumps between two types of secondary breakdowns: breakdowns from a wide hot gap or breakdown from a cold narrow gap. This is shown in FIG. 1.

The result of such a jumping mode is instability with positive feedback stimulated by dependence of temperature in plasma channel on fluctuation of flow. Small flow reduction increase temperature and so lock the flow rate. Alternatively, the reverse direction: an increase of flow cool channel and unlock flow.

This positive feedback causes a temperature instability and jumping of breakdown point from one to another point, and, in turn, causes an average power fluctuation of the plasmatron. While this may be acceptable for some applications, this can be a problem for medical applications that require high plasma stability.

SUMMARY OF THE INVENTION

Accordingly, the present invention is related to a high voltage plasmatron for generation of Nitric Oxide that substantially obviates one or more of the disadvantages of the related art.

In one aspect, a plasma generation system includes an anode having a generally cylindrical proximal portion and a generally cylindrical distal portion, the distal portion having a smaller diameter than the first portion; a connecting portion connecting the proximal and distal portions and having walls oriented at 40-60 degrees to a center axis of the anode; a cathode having a generally cylindrical shape in its proximal portion and a tapering at a 30-45 degree angle to the center axis of the anode in its distal portion, with a cylindrical rod on its tip. A gap between the connecting portion of the anode and the distal portion of the cathode is at least twice as large as a gap between the proximal portion of the anode and the proximal portion of the cathode. A high voltage power supply providing an operating voltage to the cathode. An operating voltage is 800-2500 volts and a current is 0.3-0.7 A. A length of the cylindrical rod is approximately 1.5 times a diameter of the cylindrical rod.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

The results of the proposed design according to the ideas described above are as follows. Plasmatron operation with completely different level of output power stability and region of fluctuations of average power FIG. 4, which shows average power dependence on time of conventional (top) and new proposed (bottom) plasmatrons. As this figure shows, the average power fluctuation region is about two times higher in conventual plasmatron than in modified plasmatron.

Figure 9:
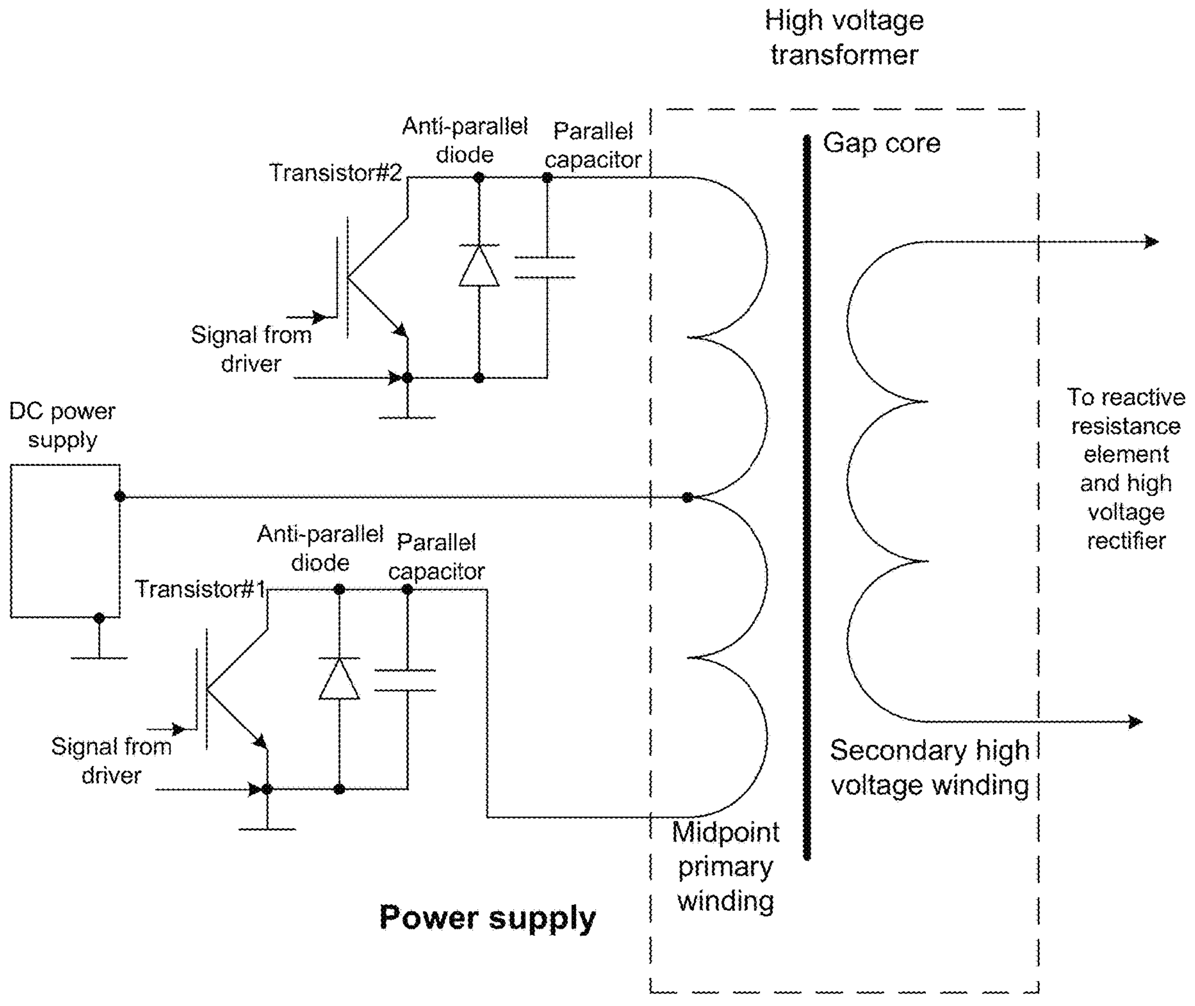
FIG. 9 shows a power supply of the proposed plasmatron.
Figure 10:
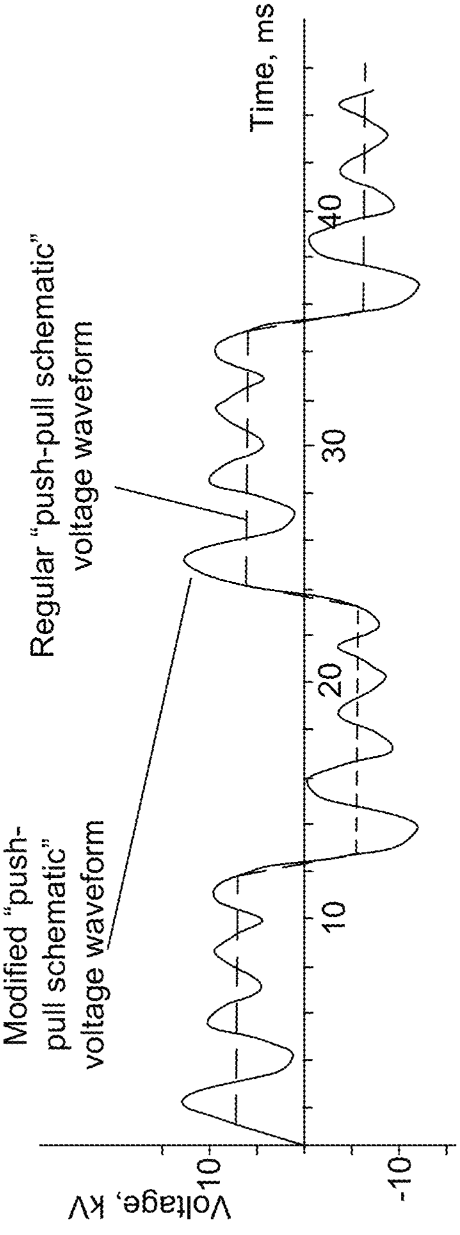
FIG. 10 shows a voltage waveform for the power supply of the proposed plasmatron.
Figure 11:
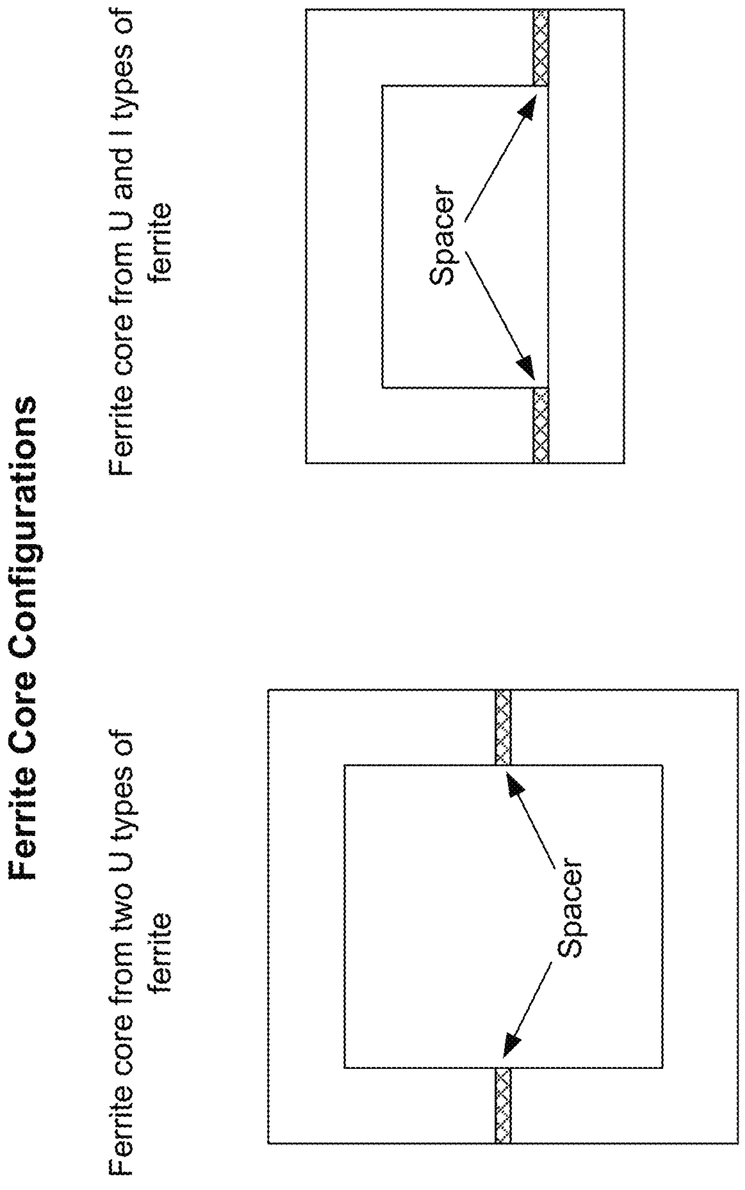
FIG. 11 shows ferrite gap core configurations of the power supply.

The invention solves the problem of instability by modification of the power supply and by modification of plasmatron design. Modified power supply should be made on the base of "push-pull" schematic consists from high voltage transformer with gap core, midpoint primary winding and high voltage secondary winding loaded to reactive current limitation schematic, based on capacitor or inductor and high voltage rectifier connected with plasmatron. Both ends of primary windings connected with transistors (IGBT, field or bipolar transistors) with anti-parallel diode, as shown in FIG. 9. When the system is in operation, both transistors are opened and closed alternately with necessary dead time between closing first and opening second transistor like in regular "push-pull" schematic. Both transistors are connected with parallel capacitors with electric capacitance value C enough to stimulate voltage U oscillations inside of opening and closing transistors cycle as shown in FIG. 10. To adjust the frequency of oscillations, a gap thickness of high voltage transformer gap core is used. The gap thickness can control effective inductance of primary windings and adjust oscillations frequency to provide two effects which are necessary for effective and stable operation of plasmatron. One effect is an increase of high voltage maximum by a factor of 2.

Maximum voltage determines the maximum length of the plasma filament, stability of electric discharge ignition and stability of frequency of secondary breakdowns. Another effect of adjustment of oscillation frequency is energy efficiency of the power supply, by adjustment of the moment of transistor opening/closing to the moment of minimum of voltage during oscillation. By the opening of transistor at the moment when parallel capacitor voltage (equal to the voltage on transistor) is minimal we minimize loses of energy storage in capacitor which is equal $C*U^2/2$. This way, a positive effect of parallel capacitor on plasmatron operation stability is reached, and at the same time energy loses at the moment of short circuit of capacitor by opening of transistor are minimized.

The problem of thermal instability described above can be solved by changing of plasmatron cathode design to make a thermal accumulator, which cannot prevent fast changing of temperature of plasma channel close to cathode tip.

Figure 1:
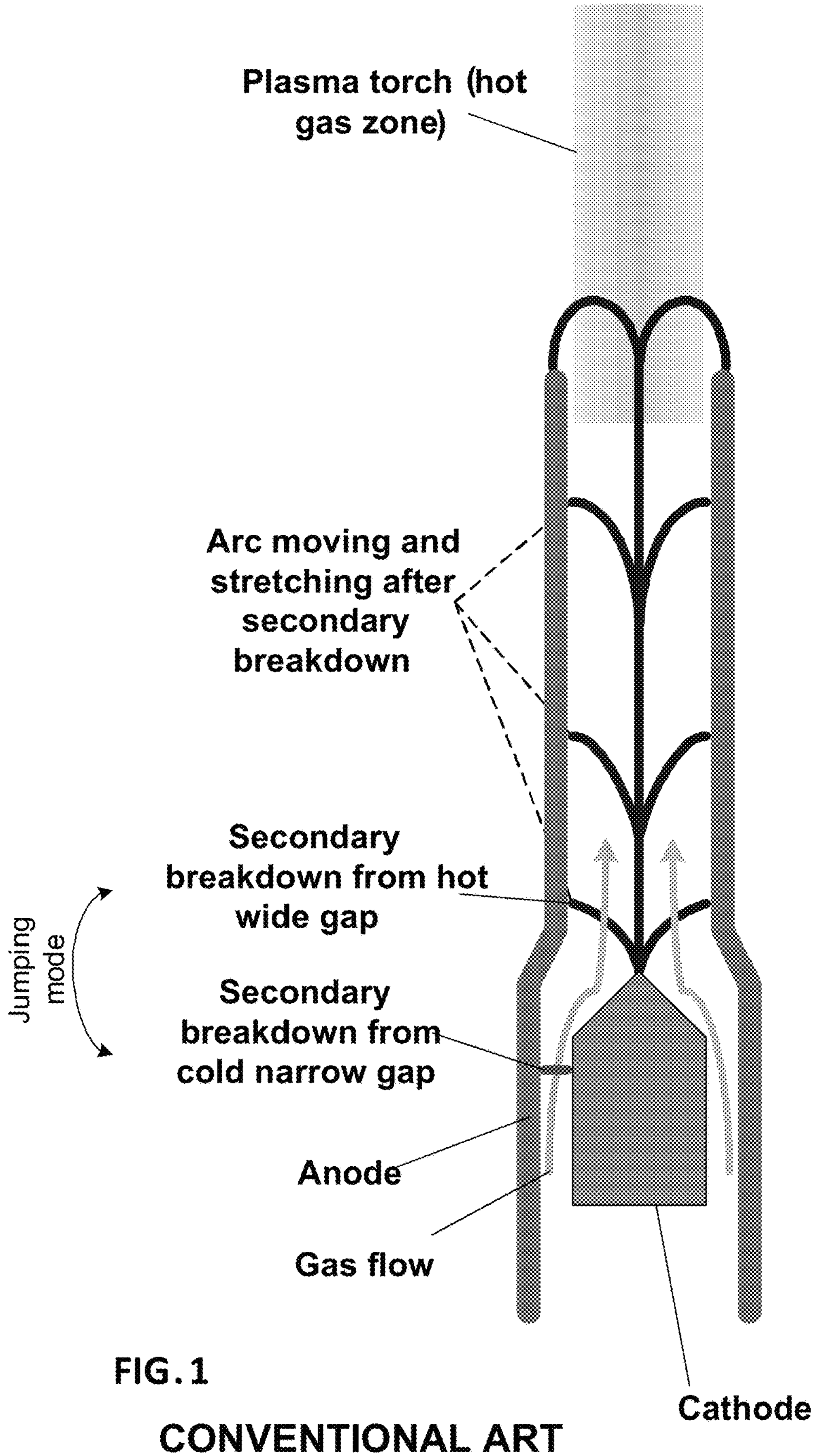
FIG. 1 CONVENTIONAL ART
FIG. 1 shows jumping place of secondary breakdown from hot wide place to cold narrow place and back.
Figure 2:
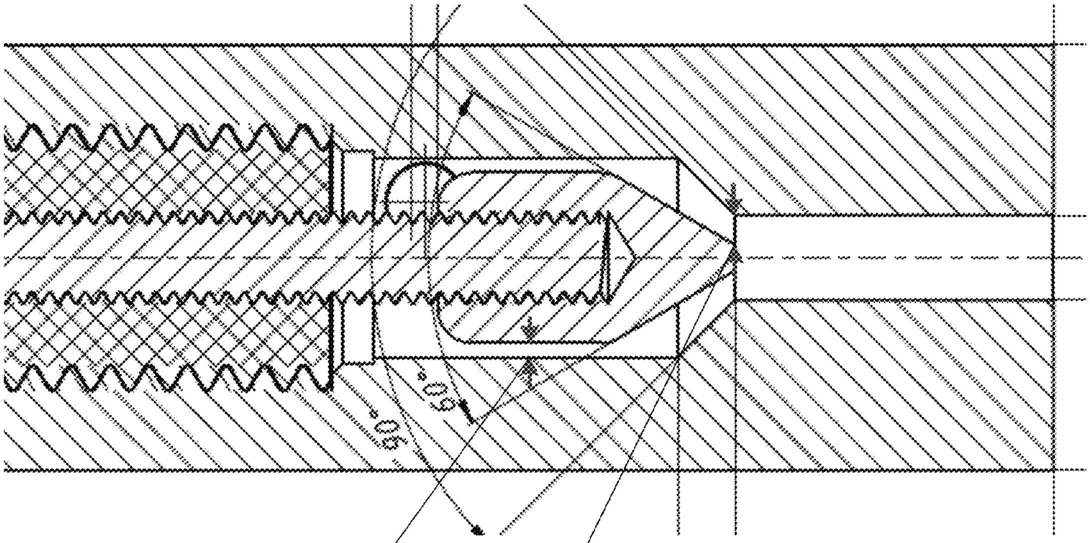
Conventional Art FIG. 2
FIG. 2 shows a cathode of a conventional plasmatron in detail.
Figure 3:
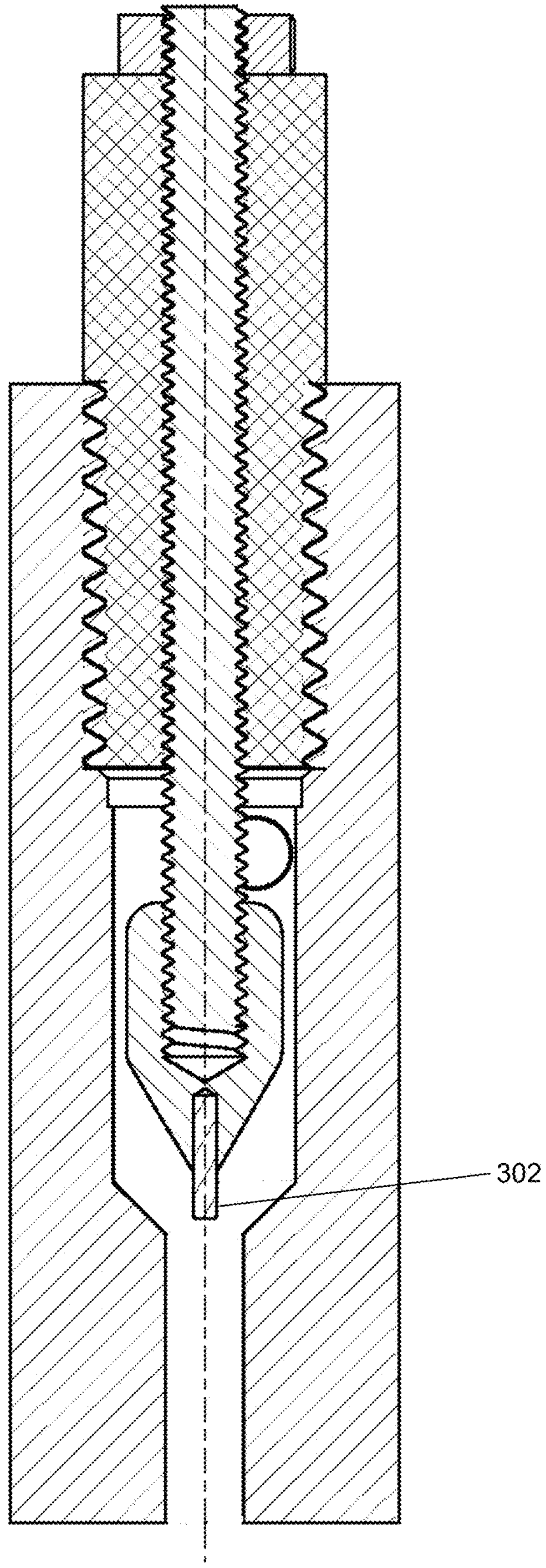
FIG. 3 shows a cathode of the proposed plasmatron.
Figure 6:
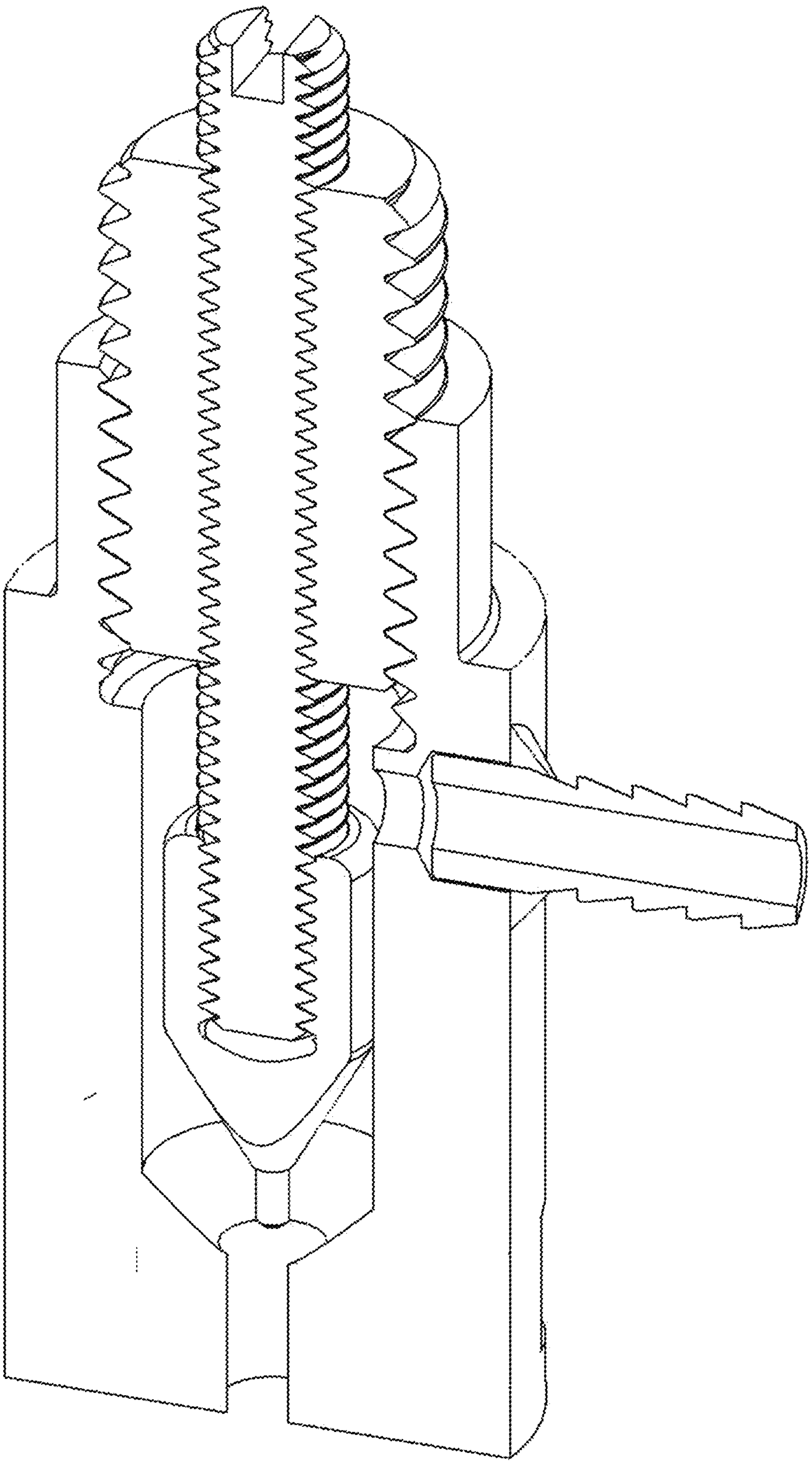
FIG. 6 shows a sectional view of the cathode and anode of the proposed plasmatron.
Figure 7:
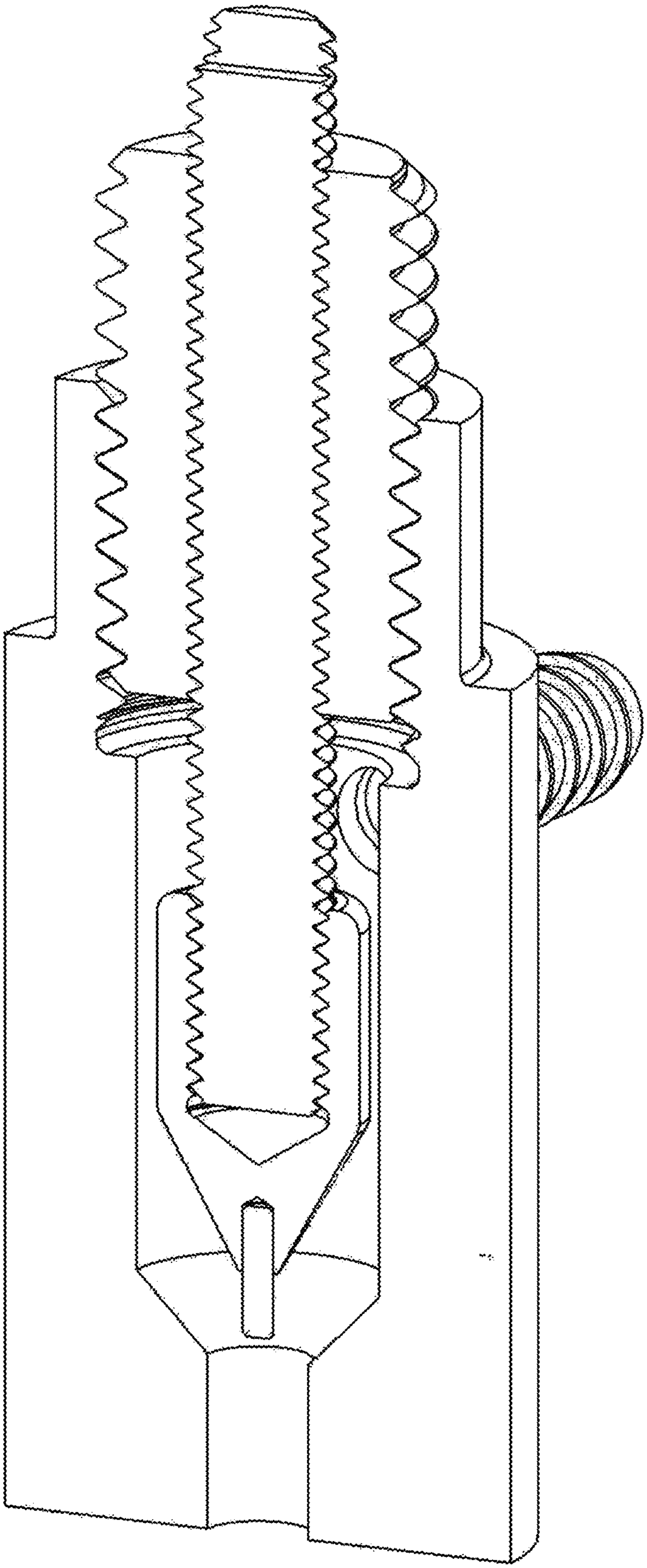
FIG. 7 shows another sectional view of the cathode and anode of the proposed plasmatron.

Instead of the cathode shown in FIG. 2, the proposed cathode has a rod 302 on the end of the conical tip, as shown in FIG. 3. Isometric cross-sectional views of the cathode structure are shown in FIG. 6 and FIG. 7.

The rod 302 can work like a thermal accumulator. When the end of this rod will be heated it can be cooled only after some minimal time because of thermal resistant of rode caused by its length and diameter rate. To calculate parameters of the rod 302, consider long rod with a length greater than the diameter. Once of rod is heated up to some temperature, we need to calculate how temperature T(X,t) of rod points will be changed as a function of time t and length x of this tip in a process of thermal transfer through the rod. Here, d—diameters of rod, and rod cross section is $$S = \frac{\pi d^2}{4},$$

Divide rod length to elements dx.

Mass of element dx is dm=ρSdx.

Energy balance of dx is:

$\partial Q = \partial Q_+ - \partial Q_-$ where $$\partial Q_+ = \frac{(T(x-dx) - T(x)) \cdot S \cdot \eta \cdot dt}{dx};$$

η—thermal conductivity coefficient of rod metal.

$$\partial Q_- = \frac{(T(x) - T(x+dx)) \cdot S \cdot \eta \cdot dt}{dx};$$

Figure 8:
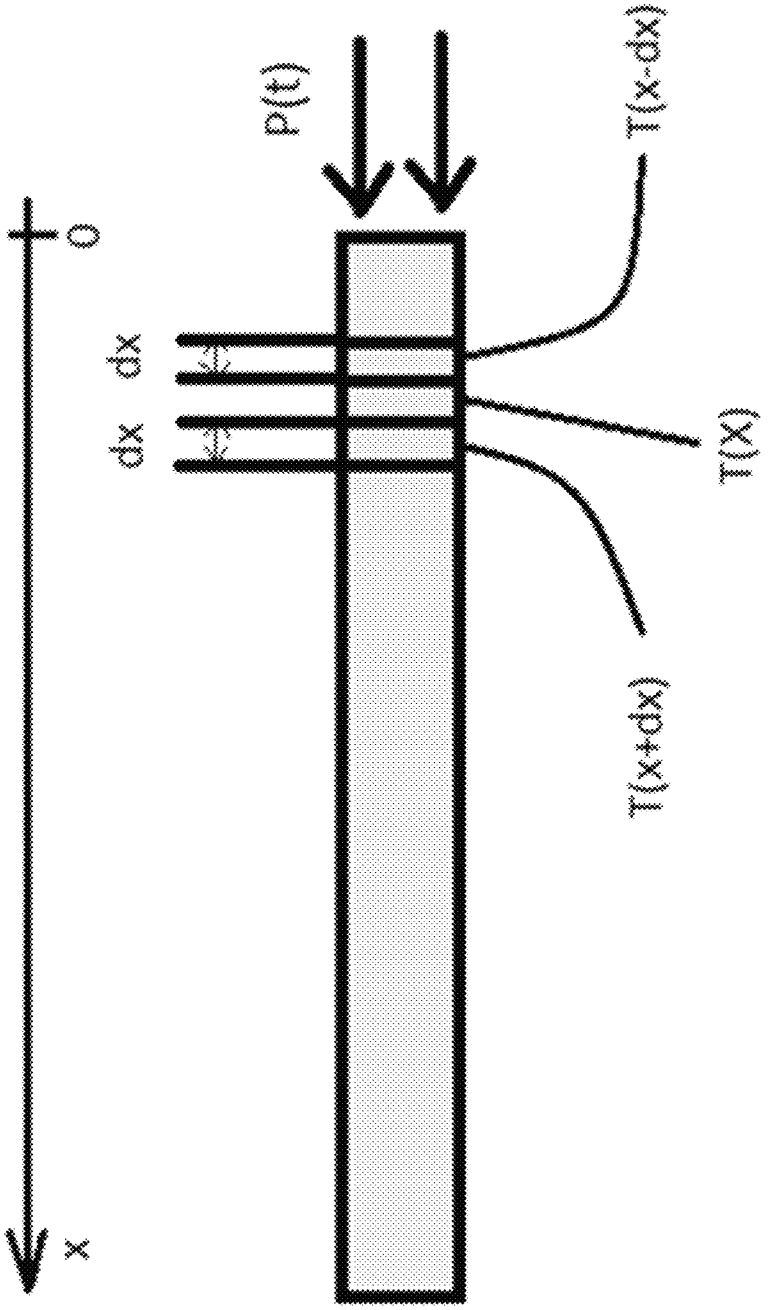
FIG. 8 shows an illustration of heat balance calculation for the cathode of the proposed plasmatron.

As shown in FIG. 8, P is power of electric discharge dissipated in rod tip. Therefore, $$\partial Q = \partial Q_+ - \partial Q_- = \frac{(T(x-dx) - T(x)) \cdot S \cdot \eta \cdot dt}{dx} - \frac{(T(x) - T(x+dx)) \cdot S \cdot \eta \cdot dt}{dx};$$

$$dT = \frac{\partial Q}{C \cdot dm};$$

$$\partial Q = Cdm \cdot dT = \frac{(T(x-dx) - T(x)) \cdot S \cdot \eta \cdot dt}{dx} - \frac{(T(x) - T(x+dx)) \cdot S \cdot \eta \cdot dt}{dx};$$

$$\text{And then: } \frac{dT}{dt} = \frac{d^2T}{dx^2} \cdot \frac{\eta}{C \cdot \rho};$$

Figure 4:
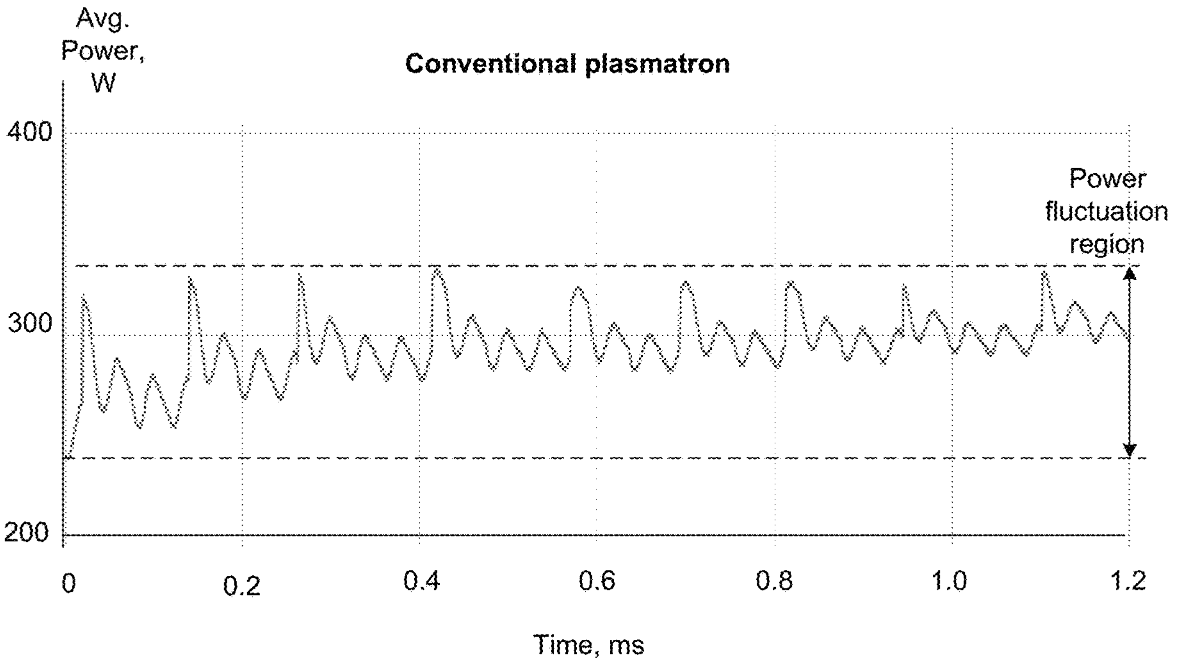
FIG. 4 shows a power curve as an average power of time for conventional and proposed plasmatrons.
Figure 4:
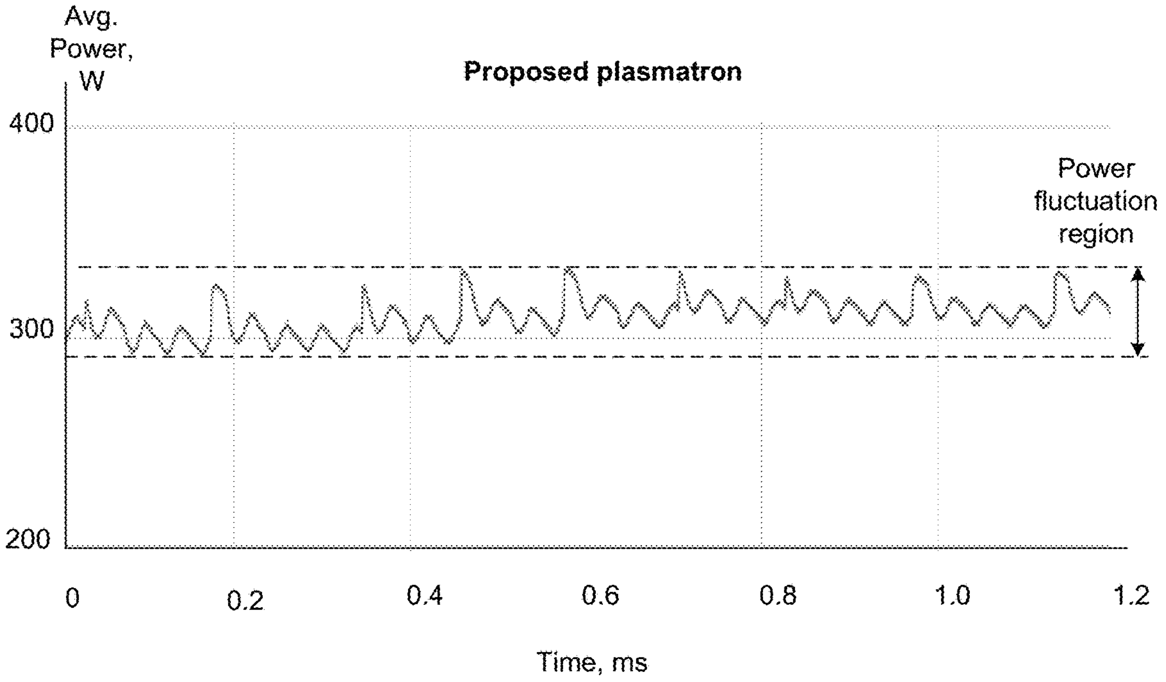
Figure 5:
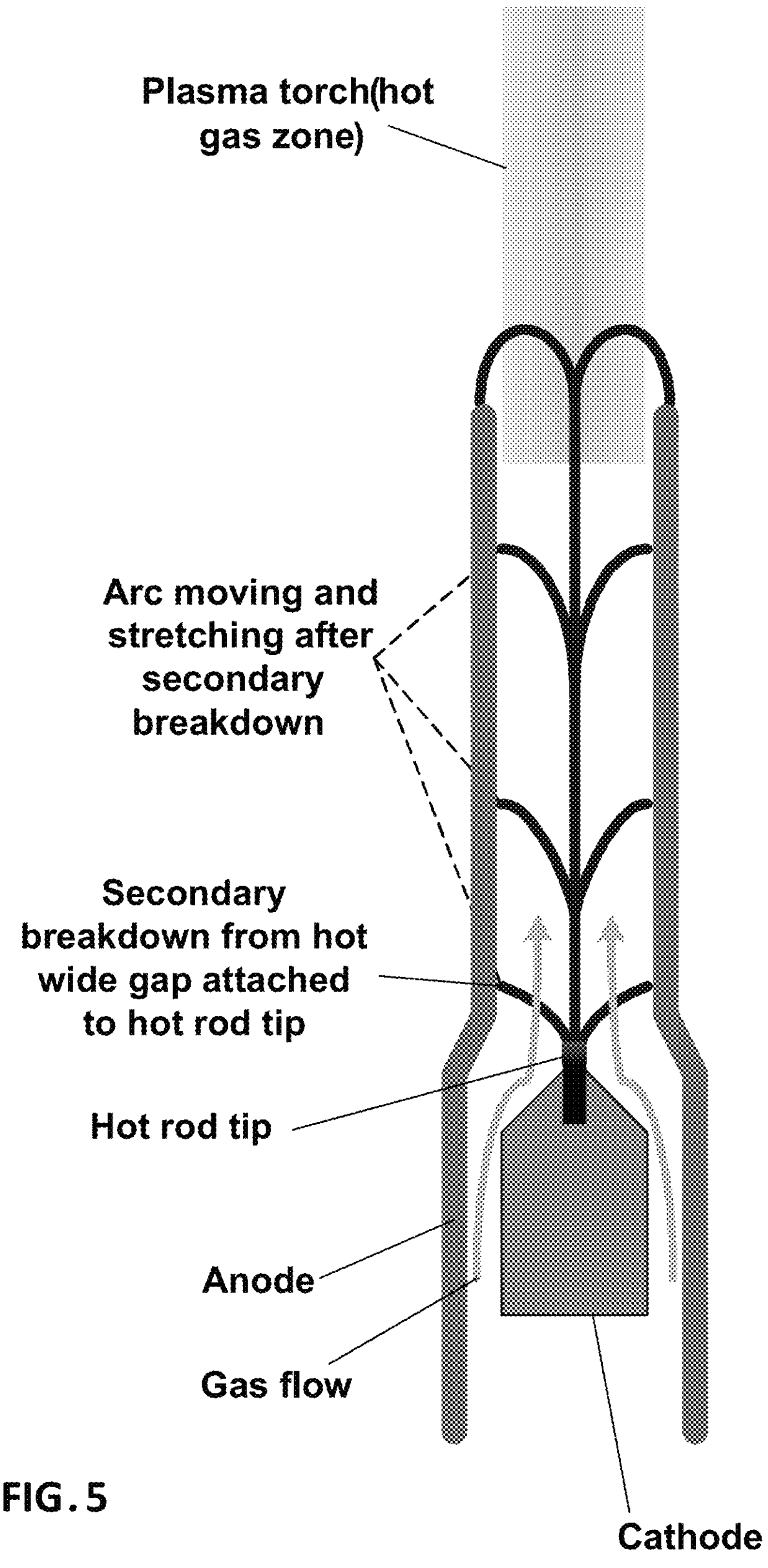
FIG. 5 shows a fixed place of secondary breakdown by thermal accumulation in hot end of rod at installed on the end of cathode.

Solving of this equation with boundary conditions characteristic for our case give us that for a hafnium rod with diameter 2 mm and length 3 mm, the temperature of the tip is below the melting temperature of hafnium and at the same cooling time is more than 0.5 millisec and this rod can work like thermal accumulator for stabilization of temperature near rod end. The result of operation of the cathode with the rod 302 we can see in the graphs of FIG. 4, showing the average power of low current plasmatron without rod in the top graph, and with the rod 302 in the bottom graph. As can be seen from these graphs, adding the rod 302 decreases power fluctuations by more than 2×.

The following are examples of rod dimensions for various operating conditions:

1. Power 300 Watts, insert (rod) made of hafnium of diameter 2 mm and length (beyond the conical portion) 3 mm Range of fluctuations reduced by 2.1× compared to a cathode without the insert.

2. Power 300 Watts, insert (rod) made of stainless steel of diameter 2 mm and length (beyond the conical portion) 3 mm. Range of fluctuations reduced by 2× compared to a cathode without the insert.

3. Power 500 Watts, insert (rod) made of hafnium of diameter 2.6 mm and length (beyond the conical portion) 4 mm Range of fluctuations reduced by 2.2× compared to a cathode without the insert.

4. Power 100 Watts, insert (rod) made of hafnium of diameter 1 mm and length (beyond the conical portion) 1.5 mm Range of fluctuations reduced by 2.2× compared to a cathode without the insert.

Generally, with a power range of 100 to 1000 Watt the insert (rod) made from material with heat conductivity 15-30 W/(m*K) should have diameter $D=\sqrt{0.01*P}$ mm and length L=1.5*D (P is power in watts).

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A plasma generation system, comprising:

an anode having a generally cylindrical proximal portion and a generally cylindrical distal portion, the distal portion having a smaller diameter than the proximal portion;

a connecting portion connecting the proximal and distal portions and having walls oriented at 40-60 degrees to a center axis of the anode;

a cathode having a generally cylindrical shape in its proximal portion and a tapering at a 30-45 degree angle to the center axis of the anode in its distal portion, with a cylindrical rod on its tip, wherein a gap between the connecting portion of the anode and the distal portion of the cathode is at least twice as large as a gap between the proximal portion of the anode and the proximal portion of the cathode; and a power supply providing an operating voltage of 800-2500 volts to the cathode;

wherein the power supply comprises two transistors in a "push-pull" configuration connected to a powered transformer, with a midpoint primary winding connected to parallel capacitors having electric capacitance value such as to stimulate oscillations of an output voltage within opening and closing transistors cycles.

2. The plasma generation system of claim 1, wherein the power supply is configured to provide the operating voltage at a current of 0.3-0.7 A.

3. The plasma generation system of claim 1, wherein a length of the cylindrical rod is 1.5 times a diameter of the cylindrical rod.

4. The plasma generation system of claim 1, wherein a diameter of the cylindrical rod is from $D=\sqrt{V0.003*P}$ to $D=\sqrt{0.03*P}$, and length of the cylindrical rod is $L=1.5*D$, where P is power in watts, and D and L are in mm.

5. The plasma generation system of claim 1, wherein the anode and the cathode are coaxial.

6. The plasma generation system of claim 1, wherein the cathode is movable along the center axis.

7. The plasma generation system of claim 1, further comprising a screw for moving the cathode along the center axis.

8. The plasma generation system of claim 1, wherein both the cathode and the anode are made from stainless steel.

9. The plasma generation system of claim 1, wherein the cathode is made of copper and the cylindrical rod is made of hafnium.

10. The plasma generation system of claim 1, wherein the anode is made of stainless steel.

11. The plasma generation system of claim 1, wherein the cathode is made of stainless steel and the cylindrical rod is made of hafnium.

12. The plasma generation system of claim 1, wherein the power supply is configured to provide a moment of transistor opening and closing at a minimum of voltage during oscillation.

* * * * *